(12) United States Patent
Yuge

(10) Patent No.: US 11,142,457 B2
(45) Date of Patent: Oct. 12, 2021

(54) METHOD FOR PRODUCING CARBON NANOHORN AGGREGATE

(71) Applicant: NEC CORPORATION, Tokyo (JP)

(72) Inventor: Ryota Yuge, Tokyo (JP)

(73) Assignee: NEC CORPORATION, Tokyo (JP)

(*) Notice: Subject to any disclaimer, the term of this patent is extended or adjusted under 35 U.S.C. 154(b) by 242 days.

(21) Appl. No.: 16/488,668

(22) PCT Filed: Feb. 23, 2018

(86) PCT No.: PCT/JP2018/006680
§ 371 (c)(1),
(2) Date: Aug. 26, 2019

(87) PCT Pub. No.: WO2018/155627
PCT Pub. Date: Aug. 30, 2018

(65) Prior Publication Data
US 2019/0382271 A1 Dec. 19, 2019

(30) Foreign Application Priority Data
Feb. 27, 2017 (JP) .............................. JP2017-035031

(51) Int. Cl.
*C01B 32/18* (2017.01)
*B01J 23/745* (2006.01)
(Continued)

(52) U.S. Cl.
CPC .............. *C01B 32/18* (2017.08); *B01J 23/745* (2013.01); *B82Y 30/00* (2013.01); *B82Y 40/00* (2013.01)

(58) Field of Classification Search
CPC ..... C01B 32/18; C01B 32/158; C01B 32/159; C01B 32/16; C01B 32/162; C01B 32/164;
(Continued)

(56) References Cited

U.S. PATENT DOCUMENTS

| 2006/0133979 A1* | 6/2006 | Azami | .................... | C01B 32/18 423/445 B |
| 2006/0210464 A1* | 9/2006 | Azami | .................... | C01B 32/18 423/445 R |

(Continued)

FOREIGN PATENT DOCUMENTS

| JP | 2009-190928 A | 8/2009 |
| JP | 2012-116704 A | 6/2012 |

(Continued)

OTHER PUBLICATIONS

Azami, et al., Large-Scale Production of Single-Wall Carbon Nanohorns with High Puirity, J. Phys. Chem. C 2008; 112: 1330-1334 (Year: 2008).*

(Continued)

*Primary Examiner* — Daniel C. McCracken
(74) *Attorney, Agent, or Firm* — Sughrue Mion, PLLC

(57) ABSTRACT

A method for producing a carbon nanohorn aggregate including a fibrous carbon nanohorn aggregate, comprising continuously irradiating with laser light a surface of a carbon target containing a metal catalyst such as iron, wherein a laser irradiation position is moved at a constant speed so that a power density of the laser light with which the surface of the carbon target is irradiated is generally constant, and irradiation is moved to a region adjacent to a region previously irradiated with the laser light, in a direction different from a moving and traveling direction of the laser irradiation position at an interval equal to or more than a width of a degradation region formed around the region irradiated with the laser light

18 Claims, 4 Drawing Sheets

(51) Int. Cl.
*B82Y 30/00* (2011.01)
*B82Y 40/00* (2011.01)

(58) Field of Classification Search
CPC ..... C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 23/745; B82Y 30/00; B82Y 40/00

See application file for complete search history.

(56) References Cited

U.S. PATENT DOCUMENTS

| | | | | |
|---|---|---|---|---|
| 2006/0237301 A1* | 10/2006 | Azami | .................... | C01B 32/16 204/157.47 |
| 2007/0003468 A1* | 1/2007 | Azami | ...................... | C09C 1/48 423/445 B |
| 2007/0003469 A1* | 1/2007 | Azami | .................... | C01B 32/18 423/445 R |
| 2007/0025905 A1* | 2/2007 | Azami | .................... | B82Y 30/00 423/447.2 |
| 2009/0301861 A1* | 12/2009 | Azami | .................... | B82Y 30/00 204/157.41 |
| 2012/0202060 A1* | 8/2012 | Yuge | ...................... | C01B 32/16 428/367 |

FOREIGN PATENT DOCUMENTS

| | | |
|---|---|---|
| WO | 2004/103902 A1 | 12/2004 |
| WO | 2007/125816 A1 | 11/2007 |
| WO | 2016/147909 A1 | 9/2016 |
| WO | 2016/208170 A1 | 12/2016 |

OTHER PUBLICATIONS

EP Office Action for EP Application No. EP18757704.4 dated Mar. 22, 2021.

International Search Report of PCT/JP2018/006680 dated Apr. 10, 2018 [PCT/ISA/210].

Azami et al., "Large-Scale Production of Single-Wall Carbon Nanohorns with High Purity", J. Phys. Chem. C, 2008, vol. 112, No. 5, pp. 1330-1334 (total 5 pages).

Communication dated Dec. 19, 2019 from European Patent Office in counterpart EP Application No. 18757704.4.

* cited by examiner

[FIG. 1(a)]
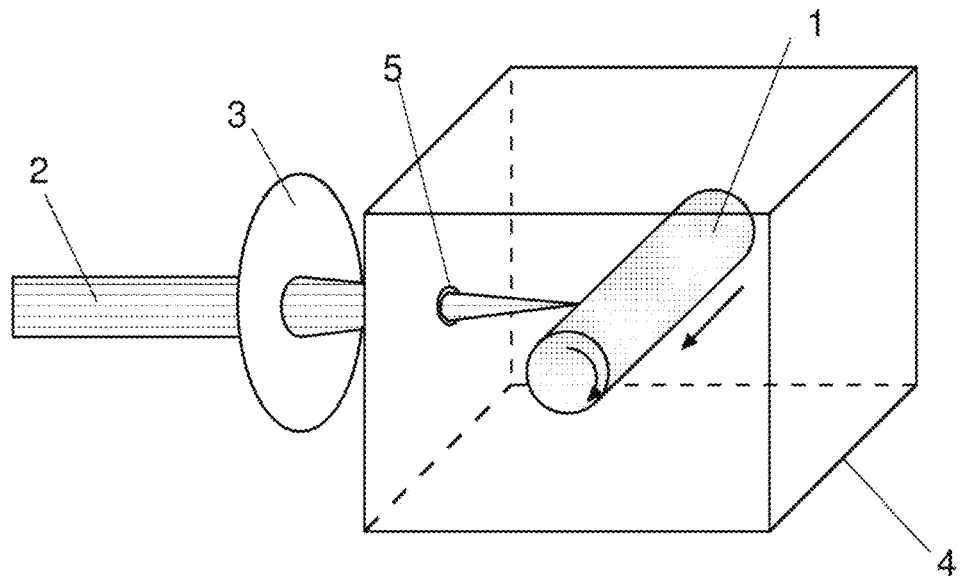
[FIG. 1(b)]
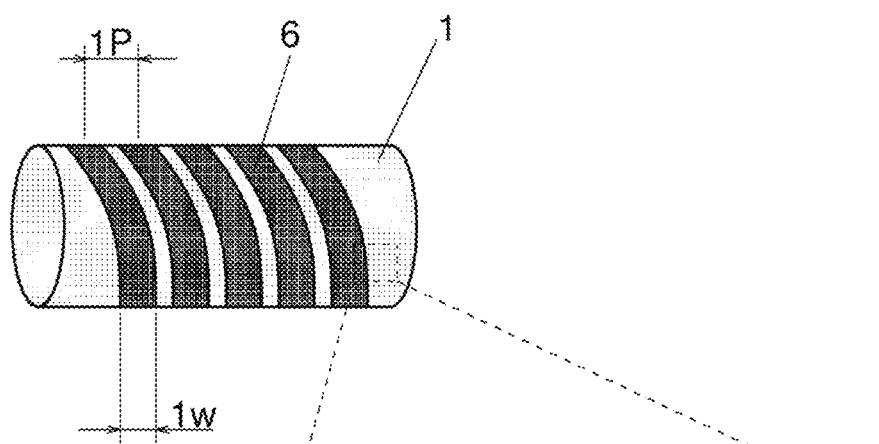
[FIG. 1(c)]
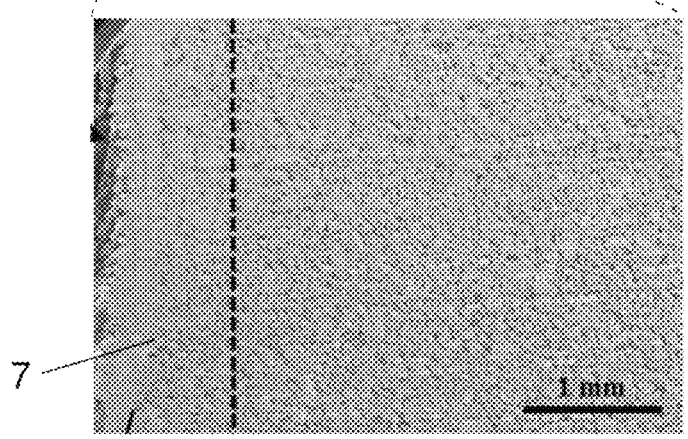

[FIG. 2]
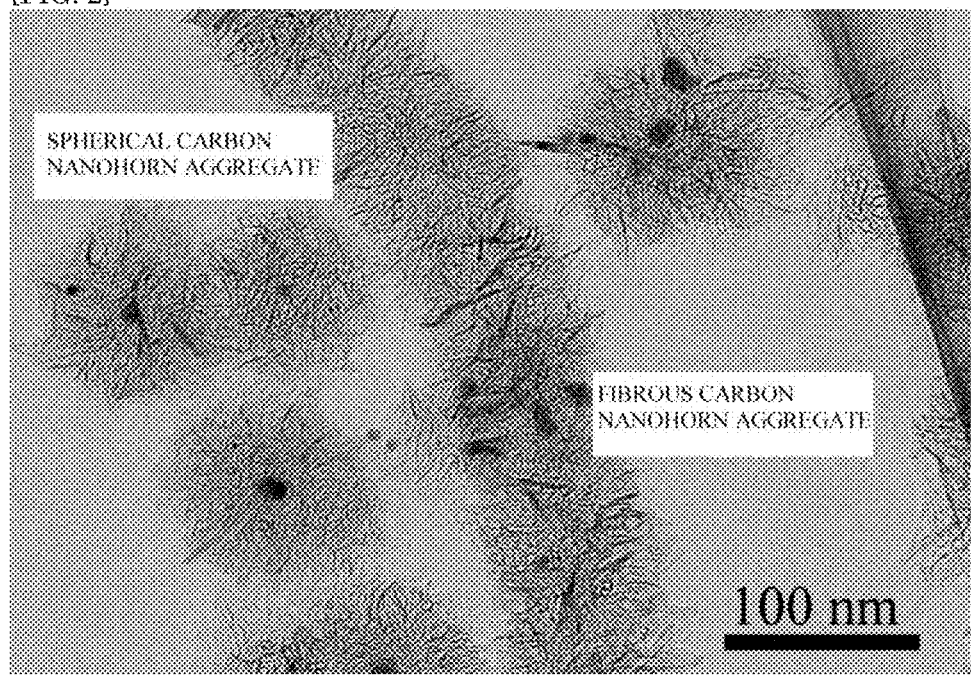
[FIG. 3]
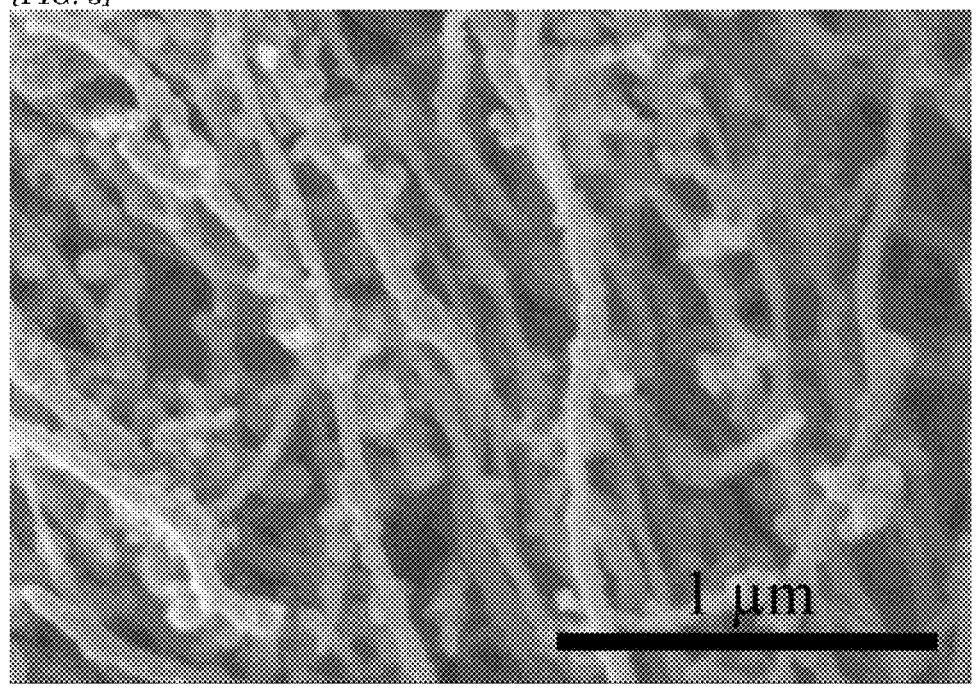

[FIG. 4]
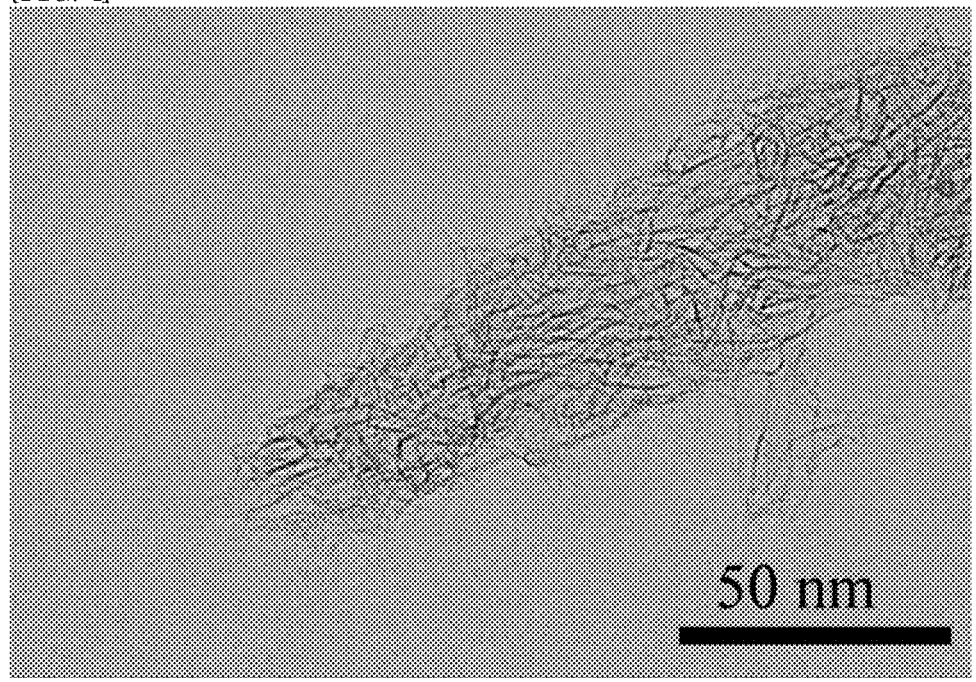
[FIG. 5]
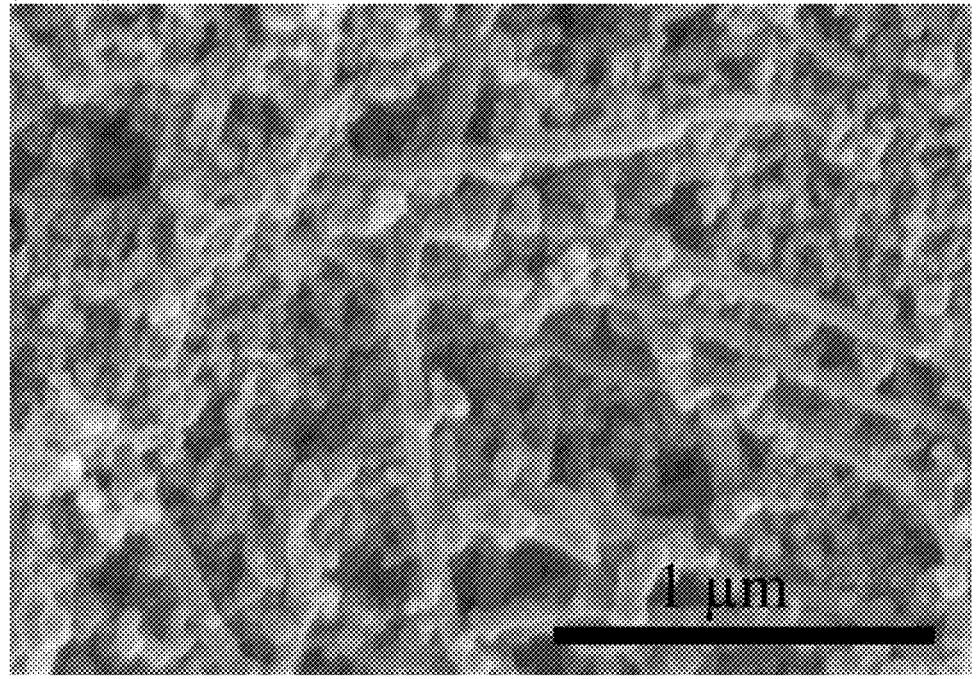

[FIG. 6]
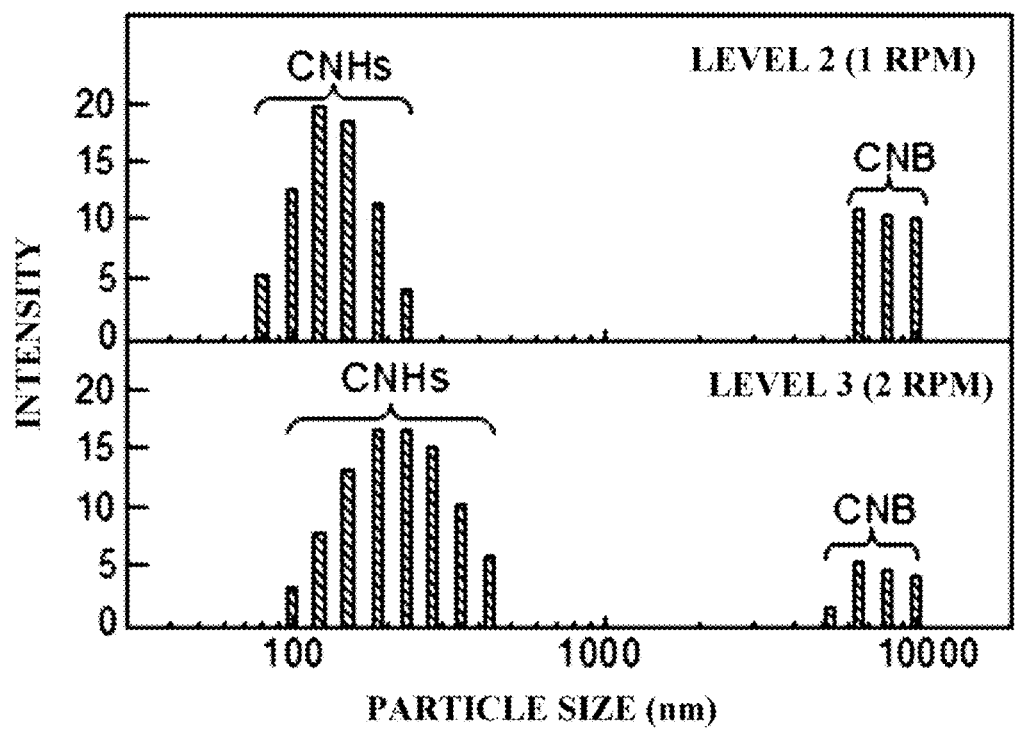
[FIG. 7]
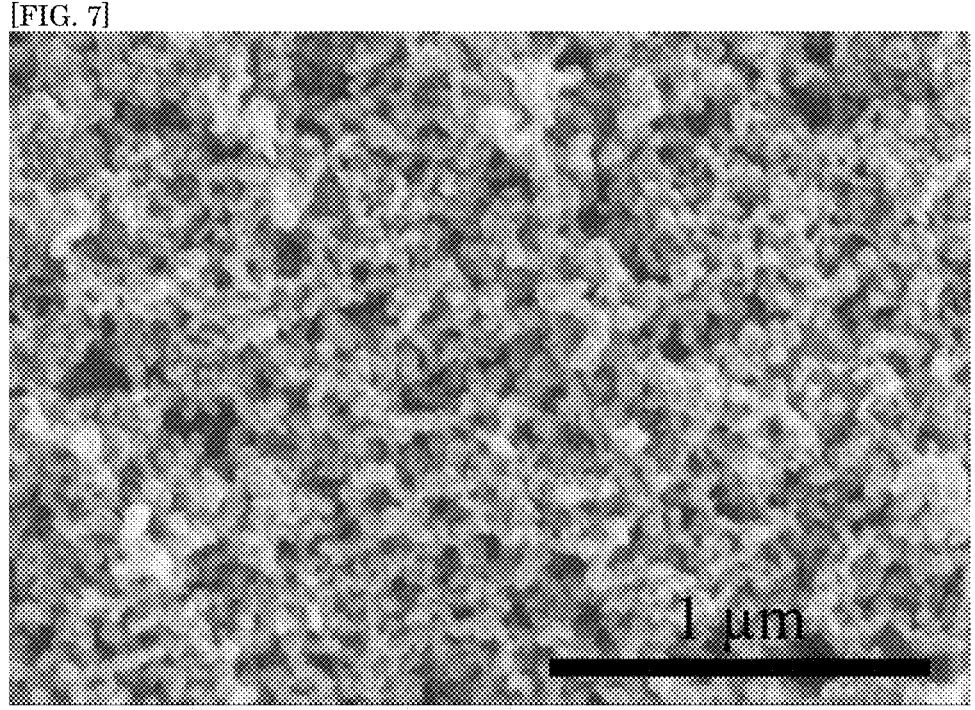

METHOD FOR PRODUCING CARBON NANOHORN AGGREGATE

CROSS REFERENCE TO RELATED APPLICATIONS

This application is a National Stage of International Application No. PCT/JP2018/006680, filed Feb. 23, 2018, claiming priority based on Japanese Patent Application No. 2017-035031, filed Feb. 27, 2017, the contents of all of which are incorporated herein by reference in their entirety.

TECHNICAL FIELD

The present invention relates to a method for producing a carbon nanohorn aggregate including a fibrous carbon nanohorn aggregate.

BACKGROUND ART

Conventionally, carbon materials have been used as electrically conductive materials, catalyst supports, adsorbents, separating agents, inks, toners, and the like, and in recent years, due to the emergence of nanocarbon materials having nanosize dimensions, such as carbon nanotubes and carbon nanohorn aggregates, their features as structures have attracted attention.

The present inventor has found a fibrous carbon nanohorn aggregate (carbon nanobrush: referred to as CNB) having a structure in which carbon nanohorns aggregate radially and extend in a fibrous form, unlike conventional spherical carbon nanohorn aggregates (referred to as CNHs) (Patent Literature 1). The CNBs are made by laser ablation while a carbon target comprising a catalyst is rotated (Patent Literature 1).

CITATION LIST

Patent Literature

Patent Literature 1: WO2016/147909

SUMMARY OF INVENTION

Technical Problem

CNBs are obtained by laser-irradiating a carbon target containing a catalyst, and CNBs and CNHs are produced together. At this time, the proportion of CNBs in the products is very small, and a method for industrially producing CNBs has not been established.

It is an object of the present invention to provide a method for industrially producing CNBs.

Solution to Problem

Specifically, according to one aspect of the present invention, there is provided:

a method for producing a carbon nanohorn aggregate including a fibrous carbon nanohorn aggregate, including continuously irradiating with laser light a surface of a carbon target containing a metal catalyst selected from a simple substance of Fe, Ni, or Co or a mixture of two or three thereof, wherein a laser irradiation position is moved at a constant speed so that a power density of the laser light with which the surface of the carbon target is irradiated is approximately constant, and irradiation is moved to a region adjacent to a region previously irradiated with the laser light, in a direction different from a moving and traveling direction of the laser irradiation position at an interval equal to or more than a width of a degradation region formed around the region irradiated with the laser light.

According to another aspect of the present invention, there is provided:

a method for producing a carbon nanohorn aggregate including a fibrous carbon nanohorn aggregate, comprising continuously irradiating with laser light a surface of a carbon target containing a metal catalyst selected from a simple substance of Fe, Ni, or Co or a mixture of two or three thereof, wherein the carbon target has a bulk density of 1.6 g/cm$^3$ or less and a thermal conductivity of 15 W/(m·K) or less.

Advantageous Effect of Invention

According to one aspect of the present invention, a method for industrially producing fibrous carbon nanohorn aggregates (CNBs) is provided.

BRIEF DESCRIPTION OF DRAWINGS

FIGS. 1(a) to 1(c) show schematic diagrams of a method for producing a carbon nanohorn aggregate according to the present invention.

FIG. 2 is a transmission electron microscopic photoimage of carbon nanohorn aggregates made by an example of one Example embodiment.

FIG. 3 is a scanning electron microscopic photoimage of carbon nanohorn aggregates made by an example of one Example embodiment.

FIG. 4 is a transmission electron microscopic photoimage of a fibrous carbon nanohorn aggregate made by an example of one Example embodiment.

FIG. 5 is a scanning electron microscopic photoimage of carbon nanohorn aggregates made by an example of one Example embodiment.

FIG. 6 shows particle size distributions according to the dynamic light scattering measurement of CNBs and CNHs made by Experimental Example 1.

FIG. 7 is a scanning electron microscopic photoimage of carbon nanohorn aggregates made in a Comparative Experimental Example.

EXAMPLE EMBODIMENTS

Example embodiments will be described below.

FIG. 2 is a transmission electron microscopic (TEM) photoimage of a fibrous carbon nanohorn aggregate (CNB) and spherical carbon nanohorns (CNHs) made by an example of one Example embodiment. FIG. 3 is a scanning electron microscopic (SEM) photoimage. The CNB has a structure in which seed type, bud type, dahlia type, petal dahlia type, and/or petal type (graphene sheet structure) carbon nanohorn aggregates are one-dimensionally connected. In other words, the CNB has a structure in which single-wall carbon nanohorns aggregate radially and extend in a fibrous form. Therefore, one type or multiple types of these carbon nanohorn aggregates are included in the fibrous structure. The opaque particles in FIG. 2 indicate a metal derived from a metal catalyst-containing carbon material used. In the following description, fibrous and spherical carbon nanohorn aggregates are sometimes collectively simply referred to as carbon nanohorn aggregates.

The diameter of each carbon nanohorn (referred to as a single-wall carbon nanohorn) constituting a carbon nanohorn aggregate is approximately 1 nm to 5 nm, and the length is 30 nm to 100 nm. A CNB can have a diameter of about 30 nm to 200 nm and a length of about 1 μm to 100 μm. On the other hand, CNHs have a diameter of about 30 nm to 200 nm and a substantially uniform size.

Simultaneously obtained CNHs are formed of the seed type, the bud type, the dahlia type, the petal-dahlia type, or the petal type alone or these combined. The seed type is a shape in which few or no horn-shaped protrusions are seen on a spherical surface, the bud type is a shape in which some horn-shaped protrusions are seen on a spherical surface, the dahlia type is a shape in which a large number of horn-shaped protrusions are seen on a spherical surface, and the petal type is a shape in which petal-shaped protrusions are seen on a spherical surface (graphene sheet structure). The petal-dahlia type is an intermediate structure between the dahlia type and the petal type. CNHs are produced in a state of being mixed with CNBs. The form and particle diameter of the produced CNHs can be adjusted by the type and flow rate of gas.

CNBs and CNHs can be separated by a centrifugation method, or by using the difference in sedimentation velocity, or the like, after dispersion in a solvent. In order to maintain the dispersibility of the CNBs, the CNBs are preferably used as they are, without being separated from the CNHs. In the CNB obtained in the example of this Example embodiment, single-wall carbon nanohorns should aggregate in a fibrous form, and the structure of the CNB is not limited to only the above structure. The "fibrous form" here refers to one in which the shape can be maintained to some extent even if the above separation operation is performed, and is different from one in which a plurality of CNHs is simply connected and is apparently in a fibrous form. In particle size distribution measurement by dynamic light scattering measurement, the peak for CNBs can be confirmed in a particle size region clearly different from that for CNHs.

CNBs have high dispersibility compared with other carbon materials having needle-shaped structures, for example, carbon fibers and carbon nanotubes. In addition, both CNBs and CNHs have radial structures, and therefore have many contact points at interfaces and strongly adsorb each other, and also strongly adsorb other members.

Next, a method for producing CNBs according to an example of one Example embodiment will be described. Here, an example of an Example embodiment according to mass production will be shown.

In order to perform the mass production of CNBs, it is important to perform continuous production. In the present invention, the raw material is a carbon target obtained by uniformly mixing fine particles of a catalytic metal and a carbon powder and then forming a mixture into a cylindrical shape or a plate shape (hereinafter referred to as a catalyst-containing carbon target). By irradiating the surface of such a catalyst-containing carbon target with laser light, the target surface is rapidly heated by the energy provided from the laser, and the target evaporates. Thus, the carbon and the catalyst form a high density state and evaporate and are emitted from the target. Then, in the process in which the evaporated carbon and catalyst cool gradually under a relatively high pressure atmosphere, CNBs and CNHs are produced. The region around irradiated with the laser light is also thermally influenced, and the carbonaceous crystalline state, the distribution of the catalytic metal, and the like change (the region is referred to as a degradation region). FIG. 1(c) shows one example of the degradation region 7 of a target 1 after laser irradiation. It seems that the target is influenced to the dotted line portion of the scanning electron microscopic image in FIG. 1(c) after irradiation, and in the present invention, this region is the degradation region. In a conventional method for producing nanocarbon including carbon nanohorns by a laser ablation method, a method is known in which laser irradiation is performed while the irradiation position is moved so that the target surface is uniform during the laser irradiation, from the viewpoint of maintaining uniform laser irradiation. In terms of reducing the material cost, it is preferred to use up all the catalyst-containing carbon target, but it has been found that even if the degradation region as described above is laser-irradiated, CNBs are not normally produced. Therefore, the laser energy is wastefully consumed.

Here, in order to efficiently use the target from an industrial standpoint, a method of passing laser light in proximity to a region where the laser light has passed once is considered, but it is necessary to pass the laser so as to be apart from a degradation region.

Therefore, an example of a first Example Embodiment is a method for producing a carbon nanohorn aggregate including a fibrous carbon nanohorn aggregate, comprising continuously irradiating the surface of a carbon target containing a metal catalyst with laser light, wherein the laser irradiation position is continuously moved so that the power density of the laser light with which the surface of the carbon target is irradiated is generally constant, and irradiation is moved to a region adjacent to a region previously irradiated with the laser light, in a direction different from the moving and traveling direction of the laser irradiation position at an interval equal to or more than the width of the degradation region formed around the region irradiated with the laser light. The degradation region tends to widen as the energy density of the laser becomes higher, as the moving speed of the laser irradiation position becomes slower, and as the thermal conductivity of the target becomes higher.

Here, "the laser irradiation position is moved so that the power density of the laser light is generally constant" means that the irradiation position (spot) of the laser light moves gradually at a constant speed, and thus the power density is substantially constant.

At this time, when the moving speed of the laser spot is too slow, the raw material cannot evaporate from the target and precipitates on the target as deposits. These precipitates are mainly graphite and carbon nanotubes, and CNHs are partially produced, but CNBs are not produced. Although the details are not clear, it is considered that the slightly evaporated raw material is consumed for the production of CNHs, and CNBs are not produced. In addition, even if the moving speed is too fast, CNHs are mainly formed, and CNBs are not produced. Therefore, the moving speed is appropriately set to be optimum according to the laser power, the spot diameter of the laser, and the amount of the catalyst of the catalyst-containing carbon target. For example, when a carbon target comprising 1 at % of iron is used as shown in Examples described later, the production of CNBs is confirmed in the range of about 5 cm/min to about 35 cm/min with a laser power of 3.2 kW and a spot diameter of 1.5 mm (a power density of 181 kW/cm$^2$). In the present invention, the moving speed is preferably 3 cm/min or more and 50 cm/min or less though it also depends on the carbon target used, the laser power, and the spot diameter.

For the laser ablation, a laser that can heat the target to high temperature, such as a $CO_2$ laser, an excimer laser, a YAG laser, or a semiconductor laser, can be appropriately used, and a $CO_2$ laser, whose output is easily increased, is most appropriate. The power of the $CO_2$ laser can be appropriately used, and an output power of 1.0 kW to 10 kW is preferred, and an output power of 2.0 kW to 5.0 kW is more preferred. When the power is lower than this range, the target hardly evaporates, which is not preferred from the viewpoint of the amount produced. When the power is over the range, the amounts of impurities such as graphite and amorphous carbon are large, which is not preferred. The laser can be performed by continuous irradiation or pulse irradiation. For mass production, continuous irradiation is preferred.

The spot diameter of the laser light can be selected from the range in which the irradiation area is about 0.02 $cm^2$ to 2 $cm^2$, that is, the range of 0.5 mm to 5 mm. Here, the irradiation area can be controlled by the laser power and the degree of condensing by a lens.

When a target is irradiated with laser light, the target is heated, and a plume (light emission) is generated from the surface of the target for evaporation. At this time, for example, when laser light forming an angle of 45° with the surface of a cylindrical target is radiated, a plume is generated in the direction perpendicular to the surface of the target. Therefore, the irradiation position needs to be in a range in which laser light does not hit a plume and does not pass a portion other than a target. In the case of a cylindrical target, the irradiation position is placed somewhat shifted in the direction opposite to the rotation direction from a position generally perpendicular toward the central axis of rotation. The irradiation position is preferably a position at which the angle formed with the tangent to the target surface at the laser spot center is 30° or more. In this case, the shape of the laser spot is a generally oval shape extending in the traveling direction, rather than a true circle, and the irradiation spot diameter is defined as the diameter in the direction orthogonal to the traveling direction at the spot center.

When the target is continuously irradiated with laser light while being simply rotated in this manner, an already irradiated region is irradiated again after one rotation. In order to prevent the already irradiated region from being irradiated, the cylindrical target is irradiated with laser light while being rotated and simultaneously moved in the rotation axis direction so that a helical orbit is formed. At this time, the traveling speed of the irradiation position increases by the amount of movement in the rotation axis direction. Moreover, in order to move irradiation to a region adjacent to the region previously irradiated with the laser light, in a direction different from the traveling direction at an interval equal to or more than the width of the degradation region, the helical orbit is controlled to have a pitch equal to or more than the diameter of the laser spot+the width of the degradation region. Here, the "pitch" refers to the distance between the centers of the laser spots, and therefore the moving speed in the rotation axis direction (referred to as feeding speed) needs to be a speed satisfying this pitch. The rotation speed and the feeding speed are adjusted in this manner.

The Laser Ablation (LA) method applied in the present invention is a method in which a target is irradiated with a laser in a pulsed manner or continuously, and when the irradiation intensity reaches a threshold or more, the target converts energy, and as a result, a plume is produced, and products are deposited on a substrate provided downstream of the target, or products are produced in space in an apparatus and collected in a collection chamber.

FIG. 1(a) shows a schematic diagram of a CNB production apparatus according to an example of one Example Embodiment and FIG. 1(b) a schematic diagram of a carbon target after laser irradiation. CNBs are produced by rotating a cylindrical carbon target 1 containing a catalyst placed in a production container (chamber) 4, and irradiating the surface of the carbon target 1 in a helical form with laser light 2. The laser light is condensed by a condensing lens 3, for example, a ZnSe lens, and the target 1 is irradiated with the laser light from an irradiation window 5 provided in the chamber 4. The target is heated by the laser irradiation, and the target evaporates. The interior of the chamber 4 is filled with nitrogen or a rare gas such as argon, and controlled to be at substantially atmospheric pressure while the flow rate is appropriately adjusted during production. By the rotation speed of the target, the feeding speed of the target, the output power of the laser, the amount of the catalyst, and the like at this time, the ratio between CNBs and CNHs obtained as a mixture changes. The thermal conductivity, density, and hardness of the target influence the amount of CNBs produced.

The pressure in the container (chamber) can be used at 3332.2 hPa (10000 Torr) or less, and as the pressure approaches a vacuum, carbon nanotubes are easily produced, and carbon nanohorn aggregates are not obtained. Using the pressure preferably at 666.61 hPa (500 Torr) to 1266.56 hPa (950 Torr), more preferably in the vicinity of normal pressure (1013 hPa (1 atm≈760 Torr)), is also appropriate for mass synthesis and cost reduction.

Any temperature can be used in the container, and the temperature is preferably 0 to 100° C., and more preferably using at room temperature is also appropriate for mass synthesis and cost reduction.

Nitrogen gas, a rare gas, or the like is introduced alone, or these are mixed and introduced, into the container to produce the above atmosphere. These gases flow through the reaction container, and the produced substances can be collected by the flow of these gases. A closed atmosphere may be produced with the introduced gas or gases. For the atmosphere gas flow rate, any amount can be used, and preferably the range of 0.5 L/min to 100 L/min is appropriate. In the process in which the target evaporates, the gas flow rate is controlled to be constant. In order to make the gas flow rate constant, it can be performed by matching the feed gas flow rate with the exhaust gas flow rate. When it is performed in the vicinity of normal pressure, it can be performed by forcing out the gas in the container with the feed gas for exhaust.

The carbon skeletons of CNBs and CNHs obtained as described above may be partially substituted by the catalytic metal element, nitrogen atoms, and the like.

In the case of a cylindrical carbon target having a diameter of 3 cm, the rotation speed is preferably 0.8 to 3.0 rpm, particularly preferably 0.8 to 1.8 rpm. When the spot diameter, that is, the width of the irradiated region 6, 1W, in FIG. 1(b), is 1.5 mm, the feeding speed is preferably 1 to 50 mm/min, more preferably 2 to 30 mm/min. In these ranges, the evaporated material sufficient to promote the production of CNBs is obtained, and laser can be irradiated to neighboring helical regions keeping off a degradation region. In addition, an unirradiated target surface is always irradiated with laser light at a constant speed, and thus the power density of the laser light with which the surface of the target is irradiated is generally constant. For example, when a carbon target containing 1 at. % of iron and having a diameter of 3 cm is irradiated with laser light under conditions of a laser power of 3.2 kW, a spot diameter of 1.5 mm, and 1 rpm, the degradation region 7 having a width of about 1 mm is confirmed as shown in FIG. 1(c). Therefore, it is found that the pitch of the helically irradiated region 6, 1P, is preferably 2.5 mm or more, and in this case, the feeding speed is preferably 2.5 mm/min or more.

For the carbon target containing the catalyst, its shape, size, and the like can be appropriately selected. For mass production, a cylindrical structure that can be continuously irradiated is preferred. The amount of CNBs produced changes by the amount of the catalyst included in the carbon target. The amount of the catalyst can be appropriately selected, and the amount of the catalyst is preferably 0.3 to 20 atomic % (at %), more preferably 0.5 to 3 at. %. When the amount of the catalyst is less than 0.3 at. %, the amount of fibrous carbon nanohorn aggregates is very small. When the amount of the catalyst is more than 20 at. %, the amount of the catalyst is large, and therefore the cost increases, which is not appropriate. For the catalyst, Fe, Ni, or Co can be used as a simple substance, or two or three can be mixed and used. Among them, Fe (iron) is preferably used alone, and a carbon target containing 1 at. % or more and 3 at. % or less of iron is particularly preferably used in terms of the amount of CNBs produced.

As described above, the content of the catalyst and the physical properties (thermal conductivity, density, hardness, and the like) of the carbon target containing the catalyst influence the production of CNBs. For the catalyst-containing carbon target, one having low thermal conductivity and low density and being soft is preferred. In other words, in an example of a second Example Embodiment, a catalyst-containing carbon target having a bulk density of 1.6 g/cm$^3$ or less and a thermal conductivity of 15 W/(m·K) or less is used. By setting the bulk density and the thermal conductivity in these ranges, the production proportion of CNBs can be increased. When the bulk density and the thermal conductivity are more than these values, the production proportions of CNHs and other carbon structures increase, and CNBs may be hardly produced. By using such a target, the target evaporates instantly by energy provided from a laser, and a space including the carbon and the catalyst with a high density is formed, and the carbon emitted from the target is gradually cooled in the space under an atmospheric pressure environment to produce CNBs.

The bulk density and the thermal conductivity can be set to the desired values by adjusting the amount of the catalytic metal, and the molding pressure and the molding temperature when producing the target.

The carbon nanohorn aggregates obtained in this manner can be further subjected to opening treatment and the like.

When fine holes are opened (opening) in the single-wall carbon nanohorns constituting the carbon nanohorn aggregates, it can be performed by oxidation treatment. By the oxidation treatment, surface functional groups containing oxygen are formed on opening portions. Further, the oxidation treatment can use a gas phase process or a liquid phase process. In the case of the gas phase process, as the atmosphere gas, air, oxygen or carbon dioxide can be used, and air is suitable from the viewpoint of cost. Further, the temperature can be in the range of 300 to 650° C., and is more suitably 400 to 550° C. When the temperature is 300° C. or higher, there is no apprehension that carbon scarcely burns and openings cannot be made. Further, when the temperature is 650° C. or lower, burning of the entire of the carbon nanohorn aggregate can be suppressed. In the case of the liquid phase process, there can be utilized nitric acid, sulfuric acid, hydrogen peroxide or the like. In the case of nitric acid, it can be used in the temperature range of room temperature to 120° C. When the temperature is 120° C. or lower, the oxidizing power never becomes too high and the oxidation never occurs than necessary. In the case of hydrogen peroxide, it can be used in the temperature range of room temperature to 100° C., and 40° C. or higher is preferable. At 40° C. or higher, the oxidizing power efficiently acts and can efficiently form openings. Further, in the case of the liquid process, combined use with light irradiation is more effective.

The catalytic metal embedded during the production of the carbon nanohorn aggregates can be removed as necessary. The catalytic metal dissolves in nitric acid, sulfuric acid, or hydrochloric acid and therefore can be removed. From the viewpoint of ease of use, hydrochloric acid is suitable. The temperature at which the catalyst is dissolved can be appropriately selected. When the catalyst is sufficiently removed, it is desirably performed by heating to 70° C. or more. When nitric acid or sulfuric acid is used, catalyst removal and the formation of openings can be simultaneously or continuously performed. The catalyst may be covered with a carbon film during carbon nanohorn aggregate production, and therefore pretreatment is desirably performed in order to remove the carbon film. In the pretreatment, it is desired to perform heating in air at about 300 to 500° C.

By heat-treating the obtained carbon nanohorn aggregates in a non-oxidizing atmosphere, such as in an inert gas, nitrogen, hydrogen, or a vacuum, the crystallinity can be improved. For the heat treatment temperature, 800 to 2000° C. can be used, and preferably 1000 to 1500° C. After opening treatment, surface functional groups containing oxygen are formed in opening portions, but they can also be removed by heat treatment. For the heat treatment temperature, 150 to 2000° C. can be used. In order to remove carboxyl groups, hydroxyl groups, and the like that are the surface functional groups, 150° C. to 600° C. is desired. For carbonyl groups and the like that are the surface functional groups, 600° C. or more is desired. The surface functional groups can be removed by reduction under a gas or liquid atmosphere. For reduction under a gas atmosphere, hydrogen can be used, and it can also be used for the above improvement of crystallinity. In a liquid atmosphere, hydrazine or the like can be used.

The mixture of CNBs and CNHs (hereinafter also referred to as a carbon nanohorn aggregate mixture) can be used as it is, or with the CNBs isolated, or after opening portions are formed. Preferably, the carbon nanohorn aggregate mixture is used as it is.

EXAMPLES

Examples will be shown below, and the present invention will be illustrated and described in more detail. Of course, the invention is not limited by the following examples.

Experimental Example 1

A cylindrical carbon target containing 1 at. % of iron (diameter: 3 cm, bulk density: about 1.4 g/cm$^3$, thermal conductivity: about 5 W/(m·K)) was mounted in a container. A nitrogen atmosphere was produced in the container. While this carbon target was rotated at a speed of 0.5 rpm (level 1), 1 rpm (level 2), 2 rpm (level 3), or 4 rpm (level 4), the target was continuously irradiated with $CO_2$ gas laser light for the time of one rotation or less of the target (30 s at 0.5 to 2 rpm and 15 s at 4 rpm). The laser power was adjusted to be 3.2 kW, the spot diameter was adjusted to be 1.5 mm, and the irradiation angle was adjusted to be about 45 degrees at the spot center. The flow rate of nitrogen gas was controlled at 10 L/min at 700 to 950 Torr. The temperature in the reaction container was room temperature.

FIG. 3 is an SEM photoimage of a sample at level 2. CNBs and CNHs are observed. It was found that a very large amount of CNBs were produced. FIG. 4 is a TEM photoimage, and it was found that in the CNB, single-wall carbon nanohorns having a diameter of 1-5 nm and a length of about 40-50 nm aggregated in a fibrous form. The CNB itself has a diameter of about 30-100 nm and a length of several μm-several tens μm. The CNHs were mostly made up of those having a diameter in the range of about 30-200 nm and a substantially uniform size. FIG. 5 is an SEM photoimage of a sample at level 3. It was found that compared with the sample at 1 rpm, the amount of CNBs produced decreased, and the amount of CNHs produced was large. FIG. 6 shows the particle size distributions obtained by the dynamic light scattering measurement of the samples at level 2 and level 3. 100 to 500 nm corresponds to CNHs, and 5-15 μm corresponds to CNB. At level 2, compared with level 3, a large amount of CNBs are included. In a sample at level 1, CNBs were hardly obtained, and CNHs, graphite, and carbon nanotubes were produced. This is due to the fact that the moving speed of the irradiation position was slow, and large amounts of graphite and carbon nanotubes were deposited on the target. On the other hand, in a sample at level 4, CNBs were hardly obtained, and CNHs and amorphous carbon were obtained. In this manner, it was confirmed that by optimizing the moving speed of the irradiation position, the production proportion of CNBs changed.

Experimental Example 2

An experiment was performed in which a target was helically rotated for the time of one rotation or more with the rotation speed of the target set at 1 rpm and the target feeding speed controlled at 1.5 mm/mim (level 5) and 5 mm/mim (level 6). Other conditions are the same as Example 1.

Samples made at level 5 and level 6 were compared. As a result of observing the sample at level 5 by an SEM, carbon fibers and graphite were produced. On the other hand, at level 6, CNBs and CNHs were produced. When the surface of the target was observed, the color of the target was changed, and the state of the target was changed, in the vicinity irradiated with the laser. Therefore, it was found that it was necessary to perform irradiation so as to avoid the degradation region, by making the feed of the target larger than the laser irradiation diameter.

Comparative Experimental Example 1

A carbon target containing 1 at. % of iron was used (the bulk density was about 1.7 g/cm$^3$, and the thermal conductivity was about 16 W/(m·K)). Other conditions are the same as level 2 in Experimental Example 1.

FIG. 7 is an SEM photoimage of a sample made in Comparative Experimental Example 1. CNBs were not produced, and CNHs, amorphous carbon, and graphite fibers were produced. Therefore, it was found that when the catalyst-containing carbon target had low thermal conductivity and low density, as used in Experimental Examples 1 and 2, CNBs were produced.

The present invention has been described with reference to the Example embodiments and the Examples, but the present invention is not limited to the above Example embodiments and Examples. Various changes that can be understood by those skilled in the art can be made in the configuration and details of the present invention within the scope of the present invention.

REFERENCE SIGNS LIST

1 cylindrical catalyst-containing carbon target
1w irradiation width (=spot diameter)
1P pitch
2 laser light
3 condensing lens
4 chamber
5 irradiation window
6 irradiated region
7 degradation region

The invention claimed is:

1. A method for producing a carbon nanohorn aggregate including a fibrous carbon nanohorn aggregate, comprising continuously irradiating with laser light a surface of a carbon target containing a metal catalyst selected from a simple substance of Fe, Ni, or Co or a mixture of two or three thereof, wherein
the carbon target has a bulk density of 1.6 g/cm$^3$ or less and a thermal conductivity of 15 W/(m·K) or less.

2. A method for producing a carbon nanohorn aggregate including a fibrous carbon nanohorn aggregate, comprising continuously irradiating with laser light a surface of a carbon target containing a metal catalyst selected from a simple substance of Fe, Ni, or Co or a mixture of two or three thereof, wherein
a laser irradiation position is moved at a constant speed so that a power density of the laser light with which the surface of the carbon target is irradiated is approximately constant, and
irradiation is moved to a region adjacent to a region previously irradiated with the laser light, in a direction different from a moving and traveling direction of the laser irradiation position at an interval equal to or more than a width of a degradation region formed around the region irradiated with the laser light.

3. The method for producing a carbon nanohorn aggregate according to claim 2, wherein a content of the catalyst in the carbon target based on carbon is within the range of 0.5 to 3 at %.

4. The method for producing a carbon nanohorn aggregate according to claim 3, wherein the catalyst is Fe.

5. The method for producing a carbon nanohorn aggregate according to claim 3, wherein the carbon target has a bulk density of 1.6 g/cm$^3$ or less and a thermal conductivity of 15 W/(m·K) or less.

6. The method for a producing carbon nanohorn aggregate according to claim 2, wherein a moving speed of an irradiation position of the laser light is in the range of 3 cm/min to 50 cm/min.

7. The method for producing a carbon nanohorn aggregate according to claim 6, wherein an output power of the laser light is in the range of 1.0 kW to 10 kW.

8. The method for producing a carbon nanohorn aggregate according to claim 7, wherein a content of the catalyst in the carbon target based on carbon is within the range of 0.5 to 3 at %.

9. The method for producing a carbon nanohorn aggregate according to claim 8, wherein the catalyst is Fe.

10. The method for producing a carbon nanohorn aggregate according to claim 8, wherein the carbon target has a bulk density of 1.6 g/cm$^3$ or less and a thermal conductivity of 15 W/(m·K) or less.

11. The method for producing a carbon nanohorn aggregate according to claim 6, wherein the carbon target is cylindrical, and rotation and movement of the target are performed so that the irradiation position moves in a helical form around the surface of the target.

12. The method for producing a carbon nanohorn aggregate according to claim 11, wherein a pitch of the helical form is equal to or more than a value obtained by adding the width of the degradation region to an irradiation spot diameter of the laser light.

13. The method for producing a carbon nanohorn aggregate according to claim 11, wherein a content of the catalyst in the carbon target based on carbon is within the range of 0.5 to 3 at %.

14. The method for producing a carbon nanohorn aggregate according to claim 13, wherein the catalyst is Fe.

15. The method for producing a carbon nanohorn aggregate according to claim 13, wherein the carbon target has a bulk density of 1.6 g/cm$^3$ or less and a thermal conductivity of 15 W/(m·K) or less.

16. The method for producing a carbon nanohorn aggregate according to claim 6, wherein a content of the catalyst in the carbon target based on carbon is within the range of 0.5 to 3 at %.

17. The method for producing a carbon nanohorn aggregate according to claim 16, wherein the catalyst is Fe.

18. The method for producing a carbon nanohorn aggregate according to claim 16, wherein the carbon target has a bulk density of 1.6 g/cm$^3$ or less and a thermal conductivity of 15 W/(m·K) or less.

* * * * *